(12) United States Patent
Maruyama et al.

(10) Patent No.: US 8,786,725 B2
(45) Date of Patent: Jul. 22, 2014

(54) CAMERA (75) Inventors: Atsushi Maruyama, Sagamihara (JP);
Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 274 days.

(21) Appl. No.: 13/362,670

(22) Filed: Jan. 31, 2012

(65) Prior Publication Data
US 2012/0127333 A1 May 24, 2012

Related U.S. Application Data (63) Continuation of application No. 11/657,972, filed on Jan. 24, 2007, now Pat. No. 8,125,526.

(30) Foreign Application Priority Data

Feb. 3, 2006 (JP) .................................. 2006-027599

(51) Int. Cl.
*H04N 5/228* (2006.01)
(52) U.S. Cl.
USPC .................................. 348/222.1; 348/207.99
(58) Field of Classification Search
USPC .......................................... 348/222.1, 207.99
See application file for complete search history.

(56) References Cited

U.S. PATENT DOCUMENTS

| 6,176,782 | B1 * | 1/2001 | Lyons et al. .................... 463/36 |
| 6,757,008 | B1 * | 6/2004 | Smith ........................... 348/143 |
| 7,460,687 | B2 * | 12/2008 | Yokoyama .................... 382/103 |
| 8,125,526 | B2 * | 2/2012 | Maruyama et al. ...... 348/208.14 |
| 2003/0198367 | A1 * | 10/2003 | Hartmann et al. ............ 382/118 |
| 2006/0280333 | A1 * | 12/2006 | Ikeda et al. ................... 382/103 |
| 2007/0086648 | A1 * | 4/2007 | Hayashi ........................ 382/154 |
| 2008/0037838 | A1 * | 2/2008 | Ianculescu et al. ........... 382/118 |
| 2010/0098301 | A1 * | 4/2010 | Zhou ............................. 382/118 |
| 2012/0114255 | A1 * | 5/2012 | Kimura ......................... 382/203 |
| 2012/0128255 | A1 * | 5/2012 | Aoyama et al. ............... 382/195 |

* cited by examiner

*Primary Examiner* — Nicholas Giles
*Assistant Examiner* — Abdelaaziz Tissire
(74) *Attorney, Agent, or Firm* — John C. Pokotylo; Straub & Pokotylo (57) ABSTRACT

A camera detects a face portion of a subject from a shot image to determine whether a shot image is a good shot candidate image from the features of the face portion and a face portion-related image portion. As examples, the features include, but not be limited to, (1) the shape and variation in contour ranging from the vicinity of the face portion, (2) the position of a hand or leg to be determined by similarity to the skin tone of the face portion, and (3) determination made from the detection result of the face portion as to whether the subject is a half-length or full-length figure.

5 Claims, 12 Drawing Sheets

CAMERA

CROSS-REFERENCE TO RELATED APPLICATION

This application is a continuation application of U.S. patent application Ser. No. 11/657,972 (referred to as "the '972 application and incorporated herein by reference) filed on Jan. 24, 2007, now U.S. Pat. No. 8,125,526 titled "CAMERA," listing Atsushi MARUYAMA and Osamu NONAKA as the inventors, the '972 application claiming the benefit of Japanese Patent Application No. 2006-027599 (incorporated herein by reference), filed Feb. 3, 2006, the entire contents of which was incorporated by reference.

BACKGROUND OF THE INVENTION

1. Field of the Invention

The present invention relates to an improvement of a digital camera, and more particularly, to a camera capable of shooting with less mistakes.

2. Description of the Related Art

There is widely known a technique for detecting a human face from an image to use it for various purposes. For example, Japanese Patent Application Laid-Open No. 2004-40491 proposes use of the size of a face to measure the distance between a subject and equipment in order to change the loudness level. Further, a camera with a function for focusing and exposure control to a face portion in an image is currently on the market.

In addition, a technique for detecting a posture of a person is known (for example, see Japanese Patent No. 2627483).

BRIEF SUMMARY OF THE INVENTION

The camera of the present invention is to detect a face portion of a subject from a shot image and determine whether the shot image is a good shot candidate image based on the features of the face portion and other image portions associated with the face portion. Examples of the features of other image portions associated with the face portion include, but not be limited to, (1) the shape and variation in contour ranging from the vicinity of the face portion, (2) the position of a hand or leg to be determined by similarity to the skin tone of the face portion, and (3) determination made from the detection result of the face portion as to whether the subject is a half-length or full-length figure.

Exemplary structural elements of the camera of the present invention can be represented as: a face portion detection part for detecting a face portion included in an image signal from the image signal output from an image pickup device; and a determination part for determining a shot image as a good shot candidate image from the position of the face portion in a frame of the image and when a contour running toward the outside of the frame from the vicinity of the face portion is formed into a predetermined shape.

Another exemplary structural elements of the camera of the present invention can be represented as: a face portion detection part for detecting a face portion included in a shot image; a skin tone detection part for detecting a skin tone of the face portion detected by the face portion detection part; and a determination part for determining a hand position in the shot image according to the detection result of the skin tone detection part.

According to the present invention, a technique can be provided which allows a user to get a good shot of a person comfortably by identifying the position of a face of a subject without missing the opportunity to get the best shot in the optimum scene or composition.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Preferred embodiments of the invention are described below with reference to the accompanying drawings.

First Embodiment

Figure 1:
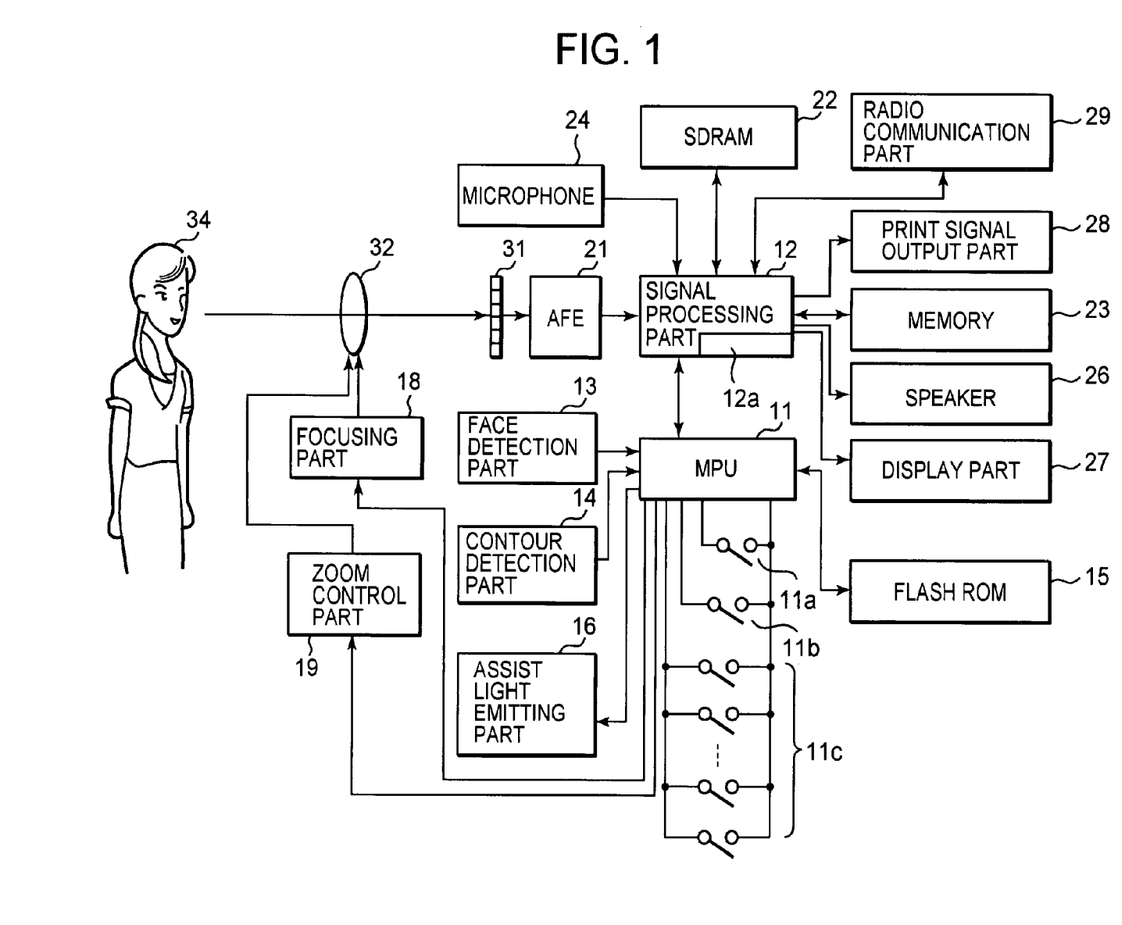
FIG. 1 is a block diagram showing the basic structure of a camera according to each of preferred embodiments of the present invention.

FIG. 1 is a block diagram showing the basic structure of a camera according to a first embodiment of the present invention. This camera includes a main CPU (hereinafter abbreviated as "MPU") 11, a plurality of switches 11a, 11b, and 11c, a signal processing part 12, a face detection part 13, a contour detection part 14, a flash ROM 15, an assist light emitting part 16, a focusing part 18, a zoom control part 19, an analog front-end part (AFE) 21, an SDRAM 22, a memory 23, a microphone 24, a speaker 26, a display part 27, a print signal output part 28, a radio communication part 29, an image pickup device 31, and a photographing lens 32.

In FIG. 1, the MPU 11 functioning as a control part and a determination part consists of a micro-controller and the like. The MPU 11 detects various user's operations according to the states of the switches 11a, 11b, and 11c connected thereto. Further, the MPU 11 sequentially controls each of the blocks to be described later to execute a shooting or playback sequence from the detection results of the switches 11a, 11b, and 11c according to a program stored in the flash ROM 15.

The switches 11a to 11c function as a power switch (11a) for switching the power on and off, a release switch (11b), and switches (11c) as a selection part for shooting, playback, and other operations to be described later. In other words, the switches 11a to 11c accept user's operations.

Connected also to the MPU 11 are the signal processing part 12, the face detection part 13, the contour detection part 14, the flash ROM 15, the assist light emitting part 16, the focusing part 18, and the zoom control part 19.

The signal processing part 12 performs processing such as color correction and signal compression. The signal processing part 12 has an auxiliary block 12a therein. The auxiliary block 12a is to boost the sensitivity after the exposure level is changed, change compensation values during image processing, and change compression rates.

The face detection part 13 analyzes an image signal obtained from the image pickup device 31, and if a person is included in subjects, it detects the person's face using the features of a human face. Then, the position and size of the detected face is determined. The contour detection part 14 has a function for determining the shape of contours of a subject in an image obtained by enhancing the sharpness of the image.

The flash ROM 15 stores various programs executed by the MPU 11 of the camera, and various adjusting values related to the camera. The assist light emitting part 16 emits assist light toward a subject 34 to compensate for exposure or capture shadows. The focusing part 18 controls the driving of the photographing lens 32 to focus the subject 34 on an imaging surface of the image pickup device 31 through the photographing lens 32 in a manner to be described later. The zoom control part 19 controls the photographing lens 32 to change the angle of view.

The signal processing part 12 is connected with the analog front-end part 21, the SDRAM 22, the memory 23, the microphone 24, the speaker 26, the display part 27, the print signal output part 28, and the radio communication part 29. The image pickup device 31 for forming an image of the subject 34 from light incoming through the photographing lens 32 is connected to the analog front-end part 21. This image pickup device 31 consists of a CCD or CMOS sensor and the like to photoelectrically convert the subject image into an image signal.

The analog front-end part 21 performs reading and A/D conversion of the converted image signal. This analog front-end part 21 also performs various control operations such as to change the exposure level of the input image. The digital image signal converted by this analog front-end part 21 is input into the signal processing part 12 in which the digital image signal undergoes various image processing to create image data.

This image data is recorded in the removable memory 23 as a recording medium. The image data to be recorded is compressed to an appropriate data size according to the setting of the camera before being recorded in the memory 23. Upon recording, since various calculations are made, data are stored in the SDRAM 22 on an as-needed basis. In the embodiment, images (including video or moving images) are first stored in the SDRAM 22, and after completion of the calculations, the data are stored in the memory 23.

The display part 27 constituting a classification display part together with the MPU 11 is composed of an LCD and the like. Signals from the image pickup device 31 are sequentially displayed on the display part 27 to allow the user to view the subject 34 in order to decide a composition. Upon playback display, compressed image data stored in the memory 23 is read and converted to display data by the signal processing part 12 according to a user's operation of the switch 11c, thereby displaying a display image on the display part 27. Similarly, for playback of recorded audio, compressed audio data stored in the memory 23 is read and converted by the signal processing part 12 according to a user's operation of the switch 11c, thereby providing audio output from the speaker 26. The memory 23 can be either a built-in type or a removable type such as a memory card.

The shot images and the like can be sent to external equipment (not shown) through the print signal output part 28 or the radio communication part 29.

In the embodiment, independent circuit units including ASICs are employed for the analog front-end part 21, the face detection part 13, the contour detection part 14, the assist light emitting part 16, the focusing part 18, and the zoom control part 19. However, the functions of these parts can be integrated into one or more units, or part or all of the functions can be implemented as programs executed on the MPU.

In such a structure, if the user operates any of the switches 11a to 11c, the MPU 11 detects the state of the operated switch and sequentially controls each of the blocks according to a program stored in the flash ROM 15 to execute a shooting or playback sequence.

Upon shooting, an image of the subject 34 incoming through the photographing lens 32 is captured and converted to an electric signal by the image pickup device 31, and corresponding digital image data is input into the signal processing part 12 through the analog front-end part 21. Then, the signal processing part 12 performs processing such as color correction and image compression, and the resulting data is recorded in the memory 23, thus completing the shooting.

Figure 2A:
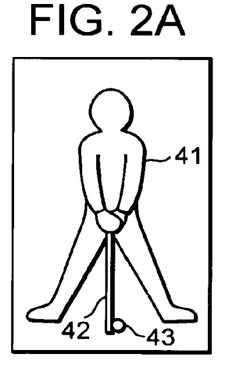
FIGS. 2A to 2C are views showing examples of photos as good shots taken of moving subjects.
Figure 2B:
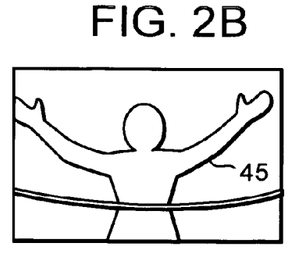
Figure 2C:
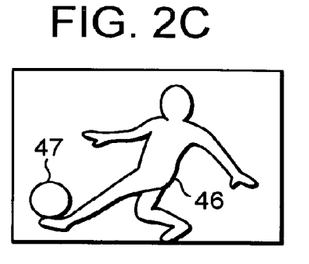

According to the present invention, a technique to be described later is applied to the camera having the aforementioned structure to provide a camera suitable for capturing moments, for example, the moment that a subject 41 strikes a golf ball 43 with a golf club 42 as shown in 2A, the moment that a subject 45 reaches the goal line at an track and field event as shown FIG. 2B, the moment that a subject 46 kicks a soccer ball 47 at a soccer game as shown in FIG. 2C, etc.

When shooting such a subject, it is very difficult to capture the subject at desired timing. Therefore, in the embodiment, a sequential shooting mode for continuously shooting a plurality of images is so used that the user can select a desired photo from the sequentially shot images.

However, as the number of sequentially shot images increases, not only does the selection of the best shot from the shot images require more time and effort, but also the available memory space inside the camera could be fully occupied by the data. Therefore, it is desirable to select only desired images automatically or semi-automatically to record only necessary images. To this end, the embodiment employs a method of analyzing images to select the desired images in consideration of a pose of the subject.

The characteristic points of the images as shown in FIGS. 2A to 2C are that the face of a person as the subject is in a proper position, the person's hand or tiptoe exists in a predetermined position or the person's arms or legs stretch out, and the person has just hit a ball or the like or the ball has just deformed on the impact.

In the embodiment, the images are narrowed down based on these conditions to select desired scenes as candidates from lots of images.

Figure 3A:
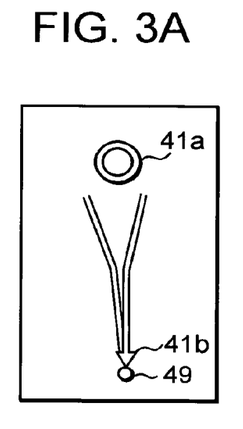
FIGS. 3A to 3C are views showing contours radially extended form the vicinity of a face and a face portion obtained as a result of contour detection in each scene corresponding to each of FIGS. 2A to 2C.
Figure 3B:
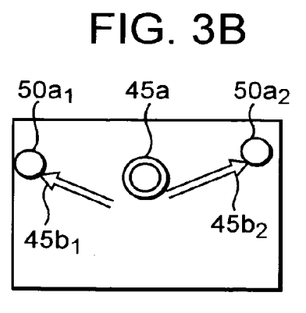
Figure 3C:
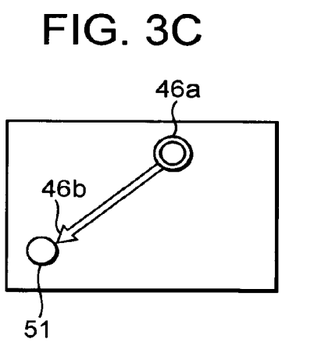

FIGS. 3A to 3C are views in which face portions and contours radially extended from the face portions obtained as a result of contour detection are extracted from the respective scenes corresponding to FIGS. 2A to 2C. In each of FIGS. 3A to 3C, a hollow arrow(s) indicates that a contour(s) is radially extended from each face portion marked with a double circle, with each tip of the contour marked with a single circle. In case of FIG. 3A, radial contours 41b are extended toward a ball 49 located directly below a face portion 41a. In case of FIG. 3B, radial contours 45b1 and 45b2 toward both hands 50a1 and 50a2 are located above a face portion 45a. In case of FIG. 3C, a leg (a radial contour 46b) stretches from a face portion 46a to the position of a ball 51. These are examples of characteristic compositions. In other words, if the four limbs stretch out or take up almost the whole frame, it can be an attractive image with full of variety. The selection of such an image is likely to meet the user's preferences, that is, the image is more likely to be a good shot.

Figure 4A:
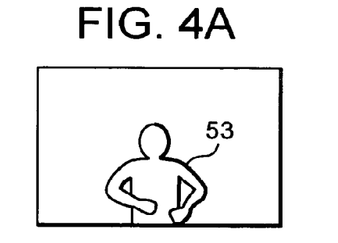
FIGS. 4A to 4C are views showing a case where the feature of a good shot is made distinct from a previous or following related frame.
Figure 4B:
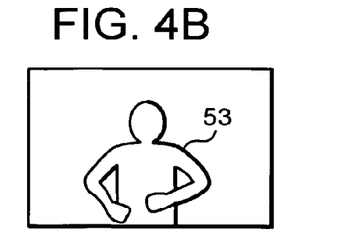
Figure 4C:
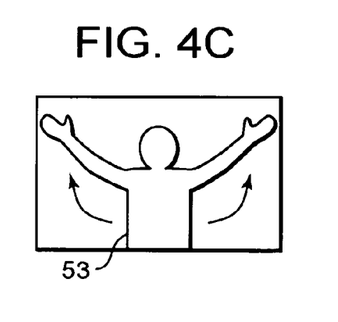

Further, as shown in FIGS. 4A to 4C, there is a case where a good shot has a distinctive feature that is different from previous and/or following frames in a sequence of shots, rather than a feature unique to each frame.

Figure 4D:
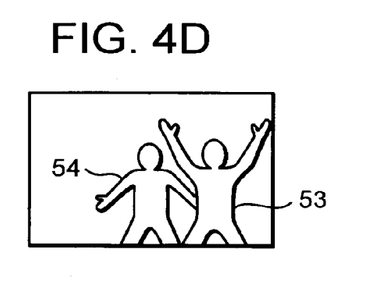
FIG. 4D is a view showing an example when shooting is done with a desired subject at the center.

Suppose that a subject 53 is running in a scene of a field and track race as shown in FIGS. 4A to 4C. In this case, the subject 53 is running with his arms below the shoulder level before reaching the goal as shown in FIGS. 4A and 4B. Then, at the moment of reaching the goal in first place, since the subject 53 is likely to change his motion in a discontinuous manner such as to stretch his arms high in the air as shown in FIG. 4C, this shot can be selected as a good shot. However, if the user wants to take a picture of a subject (person) 54 other than the person as the first finisher, the user should keep the subject 54 at the center of a screen as shown in FIG. 4D. In this case, it can be set that the shot as shown in FIG. 4D is eliminated from selection.

Figure 5A:
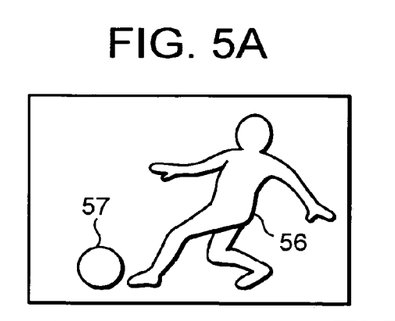
FIGS. 5A to 5C are views for explaining the moment that a subject kicks a ball.
Figure 5B:
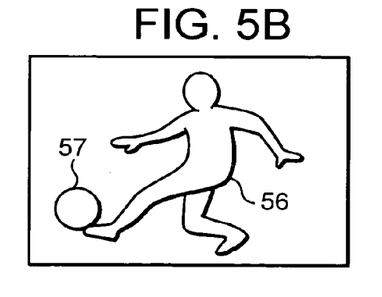
Figure 5C:
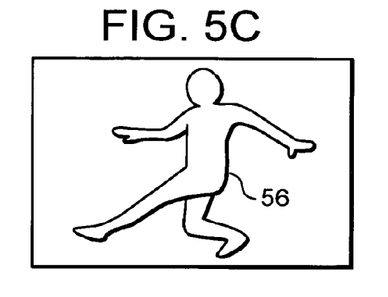

Suppose further that the user wants to capture the moment that a subject 56 kicks a ball 57 as shown in FIGS. 5A to 5C. In this case, the ball 57 appears in frames shown in FIGS. 5A and 5B, but disappears from a frame shown in FIG. 5C. Therefore, the frame immediately before the ball 57 disappears, the frame in FIG. 5B in this case, can be deemed as a good shot.

Thus, since the good shot candidate is selected in comparison with the previous and following frames, a more effective and strong shot can be selected.

Figure 6A:
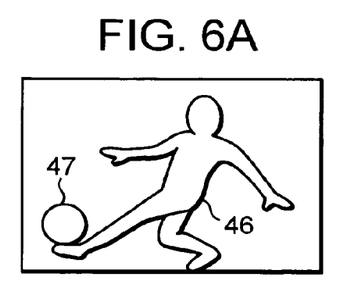
FIGS. 6A to 6C are views for explaining an example for obtaining a good shot at the moment when the subject kicks the ball.
Figure 6B:
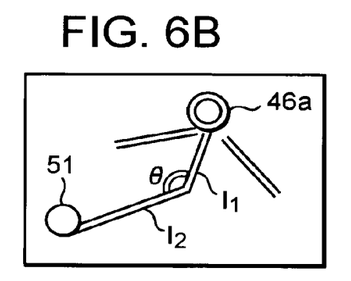
Figure 6C:
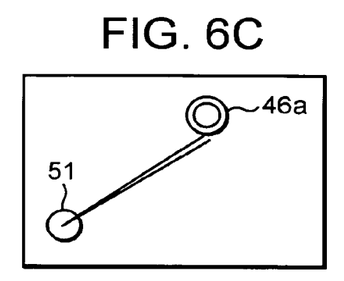

In a practical sense, in the scene as shown in FIG. 6A, a radial contour does not run straight from a face portion 46a to a tiptoe (ball 51) as shown in FIG. 6C. However, as shown in FIG. 6B, if the angle θ between a contour $l_1$ radially extended from the face portion 46a and the following contour $l_2$ is predetermined degrees or more to make the contours look like a straight line, it can be set that the contours are deemed to be a string of radial contours. Thus, a powerful scene of the subject 46 stretching his leg out can be selected.

Figure 7A:
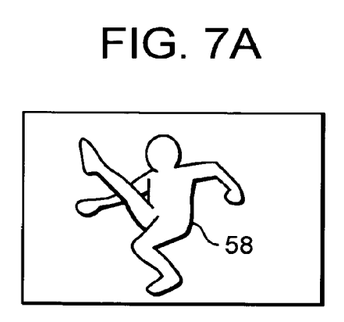
FIGS. 7A to 7B are views for explaining another example for obtaining a good shot at the moment when the subject kicks the ball.
Figure 7B:
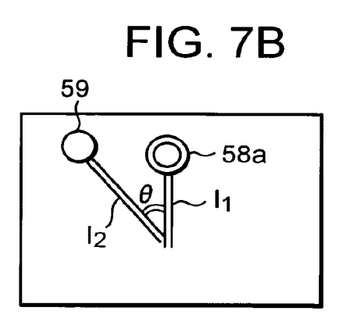

On the other hand, as shown in FIG. 7A, a scene of a subject 58 lifting his leg high also looks powerful. In this case, from a point of view similar to that shown in FIG. 6C, if the contour $l_2$ is detected in advance in previous scenes to track the tip of the contour across the previous scenes, a scene in which the tip of the contour comes to a position above the head can be selected as a good shot candidate.

Next, based on the above-mentioned point of view, the shooting operation of the camera in the embodiment will be described with reference to flowcharts of FIGS. 8 and 9.

Figure 8:
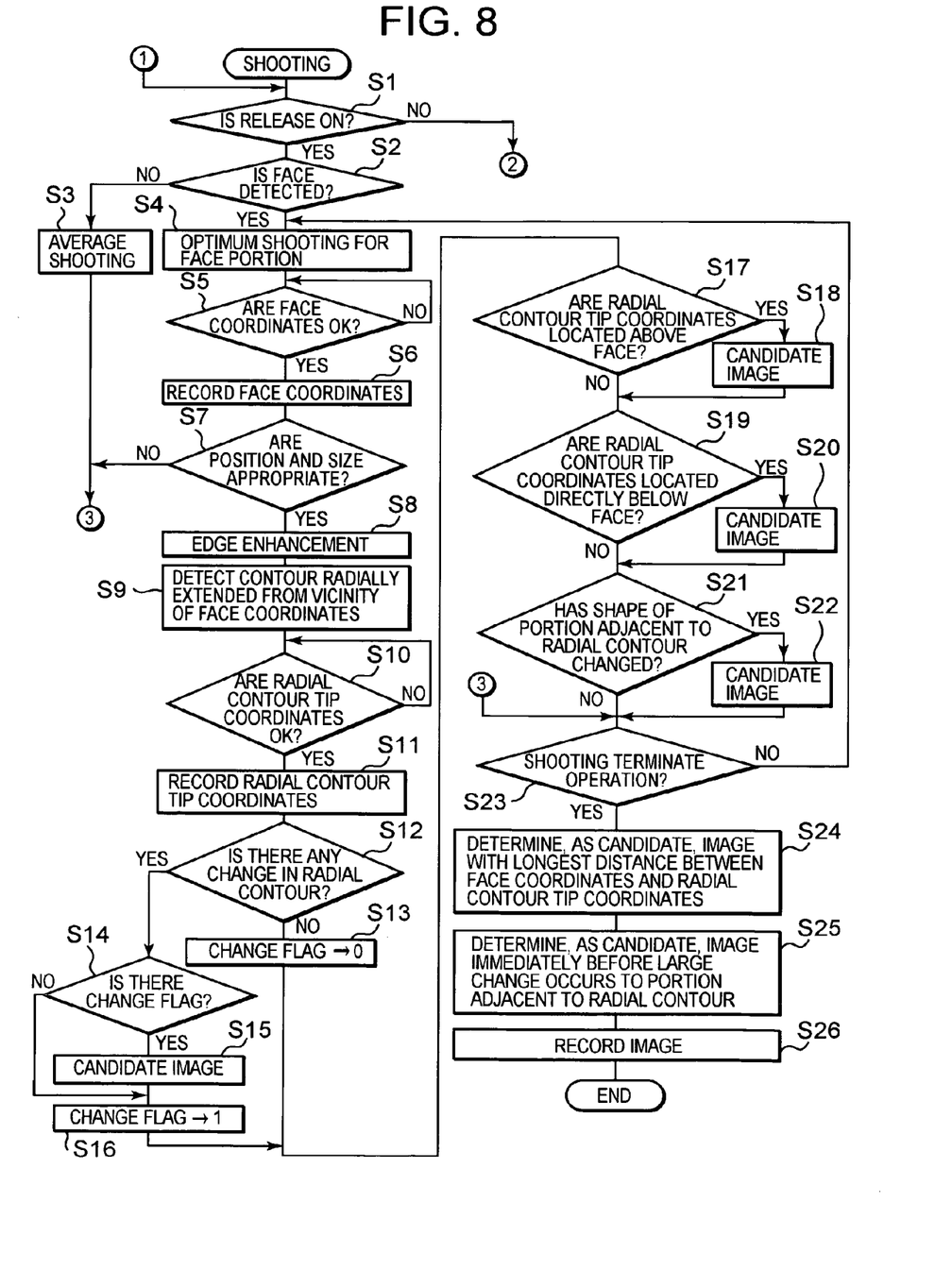
FIG. 8 is a flowchart for explaining the shooting operation of the camera according to the first embodiment of the present invention.

FIG. 8 shows processing when a shooting mode is selected with an operation of the switch 11C. When this sequence is started, the state of the release switch 11b is first determined in step S1. In other words, it is determined whether the user or photographer has pressed the release switch 11b. If the release switch 11b is pressed, the MPU 11 detects the press, and the camera enters the shooting procedure starting from step S2. On the other hand, if the release switch 11b is not pressed, the procedure shifts to step S27 to be described below.

Figure 9:
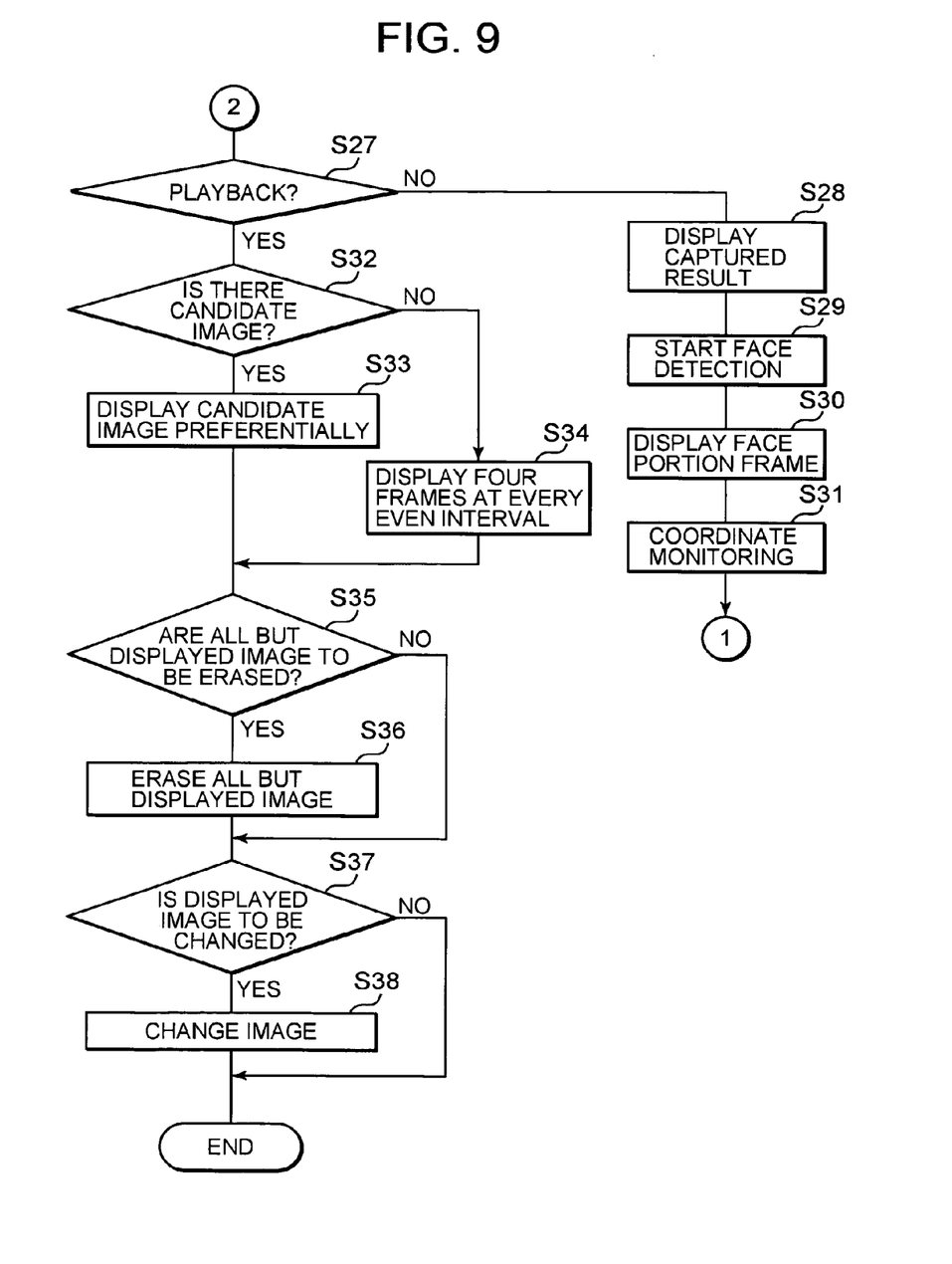
FIG. 9 is a flowchart for explaining the shooting operation of the camera according to the first embodiment of the present invention.

In FIG. 9, it is determined in step S27 whether the operation mode is a playback mode from the state of the switch 11c. If it is not the playback mode, the procedure goes to step S28 in which signals output from the image pickup device 31 are displayed in real time on the display part 27. The user decides the timing of pressing down the release switch 11b while viewing the images displayed on the display part 27.

During display of real-time images, detection of a face portion is performed in steps S29 to S31 before shooting. This detection of the face portion is performed using a known technique for analyzing and detecting the arrangement of subject's eyes, ridge of nose, and mouth, such as pattern matching. Alternatively, a pattern of light emitted from the assist light emitting part 16 and reflected from the subject can be detected by a sensor such as the image pickup device 31. Further, these methods can be used together.

Thus, since the face portion is detected before actual shooting, processing after the release switch is pressed can be speeded up.

When the face portion is detected in step S29, a face portion frame (not shown) appears in a corresponding position on the display part 27 to inform the user that the face portion is detected correctly. Further, in step S31, the coordinate position (the position of the face being displayed) is monitored. This allows the user to identify the position of the face portion on the spot upon shooting.

Under this condition, when the user operates the camera to start shooting, the procedure shifts to step S2 in FIG. 8 to determine whether the face has already been detected. If the face has not been detected yet, the procedure goes to step S3 in which average shooting is performed to make the entire area of the image proper on average without putting emphasis on the face portion. After that, the procedure shifts to step S23.

On the other hand, if it is determined in step S2 that the face portion has already been detected, the procedure goes to step S4 in which optimum shooting for the face portion is performed to adjust the exposure and focus on the face portion. Then, in steps S5 and S6, the face coordinates are determined and the resulting coordinates are recorded for each frame. Then, in step 7, it is determined whether the size and position of the face is appropriate or not. If it is not appropriate, since it means that the shot can not be considered a good shot, the procedure shifts to step S23 to be described later. On the other hand, if the size and position of the face is appropriate, the procedure goes to step S8 in which the signal processing part 12 performs sharpness processing or the like as image processing to enhance the edges of the image.

Then, in step S9, a contour(s) radially extended from the vicinity of the face recorded in step S6 is detected and selected. Then, in steps S10 and S11, the coordinates of the tip of the contour(s) (for example, see ball 49 in FIG. 3A, hands $50a_1$ and $50a_2$ in FIG. 3B, or ball 51 in FIG. 3C) are determined and recorded. Through such a process, the coordinates of subject's face and limb tip (see FIG. 8) are recorded in due order. If changes in these coordinate positions are tracked to determine whether each image is good shot or not, such a scene as shown in FIG. 7A can be determined as a good shot.

Then, in step S12, a change in the contour determined in step S11 as a radial contour is determined. For example, if the change in the contour is larger than a reference value like the change from FIGS. 4B to FIG. 4C, the procedure goes to step S14, while it is smaller, the procedure goes to step S13 to set a change flag "0". Here, the position coordinates of the radial contour tip in step S10 and/or the amount of change in the radial contour in step S11 can be prerecorded in the flash ROM 15 to determine the magnitude of the change in the contour based on the prerecorded data.

If the change in the contour is large, the change flag is set to "1" in step S16 in a manner to be described later. This shooting sequence is repeated to perform sequential shooting until the user operates the camera to instruct a terminate operation to turn the release off. During this repetition, if the change flag is changed from "0" to "1", the presence or absence of this change is then determined in step S14. If the change flag is changed, the image for which the change flag is changed is selected in step S15 as a candidate image. On the other hand, if there is no change in the change flag, step 15 is skipped. After that, the change flag is set to "1" in step S16. Thus, in the embodiment, when the contour radially extended from the face portion is changed by an amount more than the reference value, that is, when the change flag is changed, the image for which the change flag is changed is selected as a candidate image.

Further, in operation steps starting from step S17, it is also determined whether the subject's pose is appropriate or not. In step S17, it is determined whether the coordinate position of the radial contour tip (the position of a limb tip) lies above the face recorded in step S6 like the scenes shown in FIGS. 2B and 7A. As a result, if the coordinate position of the radial contour tip lies above the face, the procedure goes to step S18 to select the image as a good shot candidate image. If the coordinate position of the radial contour tip does not lie above the face, step S18 is skipped.

Then, in step S19, it is determined whether the coordinate position of the radial contour tip lies directly below the face coordinates like the scene shown in FIG. 2A. As a result, if the coordinate position of the radial contour tip lies directly below the face coordinates, the procedure goes to step S20 to select the image as a good shot candidate image. If the coordinate position of the radial contour tip does not lie directly below the face coordinates, step S20 is skipped.

Then, in step S21, it is determined whether the shape of an object adjacent to the radial contour tip (for example, the shape of the ball 57 in FIGS. 5A and 5B) is changed or not. As a result, if the shape of the object adjacent to the radial contour tip is changed, the procedure goes to step S22 to select the image as a good shot candidate image. If the shape of the object adjacent to the radial contour tip is not changed, step S22 is skipped.

Thus, through the operation steps S17 to S22, powerful scenes of the subjects stretching his arms or leg high in the air, tense scenes of subjects staying focused on a play or the like with their arms stretching to a point directly below their faces, or images of the moments when subjects have just struck or hit a ball or the like can be recorded as good shot candidate images. The determination in each of steps S17, S19, and S21 is made, for example, by prestoring template data having information on each coordinate position or each area in the flash ROM 15 to compare each image with the prestored template data. Any other techniques capable of making the determination in a like manner can also be employed.

Then, after completion of the determination of the subject's pose, it is determined in step S23 whether the shooting terminate operation is instructed. If it is not instructed, the procedure returns to step S4 to repeat the processing starting from step S4. On the other hand, if completion of shooting is instructed, the procedure goes to step S24.

Steps S24 and S25 are provided to select an image by comparing previous and/or following frames when a scene cannot be determined to be a good shot or not on a frame basis.

In other words, in step S24, the coordinates of the radial contour tip are compared with the coordinates of the face position to determine the scene in which the distance therebetween is longest to be a candidate image. In this case, a scene of a subject stretching out his arms or leg across the frame is selected as a good shot candidate. This is suitable for taking pictures of a fast moving subject. Then, in step S25, a good shot candidate is selected based on the magnitude of a change of an object adjacent to the radial contour (ball 57 in this case) in a scene change, for example, where the ball 57 has disappeared from the frame as shown in FIGS. 5B and 5C. In this case, since the previous scene (for example, FIG. 5B in FIGS. 5A to 5C) is selected, there is a high possibility that the most impressive moment will be selected. Note that if the procedure shifts to step S23 via step S3, since no face detection is performed, the processing steps S24 and S25 are not executed in practice.

Further, in step S26, the shot image is recorded.

Thus, good shot candidate images are detected during and after shooting. Then, when the user changes a mode switch (11c or the like in FIG. 1) to the playback mode, the procedure shifts from step S27 to step S32.

In step S32, the presence or absence of a candidate image is determined. As a result, if there is a candidate image, the procedure goes to step S33 to display the image preferentially. On the other hand, if there is no candidate image, the procedure shifts to step S34 to display as candidate images four frames obtained by dividing sequential shots at even intervals. Here, each shot image is determined as to whether it is a candidate image or not, and the determination result is recorded as attribute information for each image. Alternatively, only link information indicating a link between each shot image and the presence or absence of a candidate image can be recorded as a control file separately from the shot image.

Then, in step S35, a message to inform the user whether to erase images other than the displayed image appears, for example, on the display part 27. If the user operates the camera to erase the images other than the displayed image, the procedure goes to step S36 to execute the operation. As a result, needless images are deleted from the memory 23 not to cause a problem for the next shooting. On the other hand, if the user instructs the camera in step S35 not to erase the images other than the displayed image, step S36 is skipped. Thus, only the good shots are left to always keep enough memory space in the memory 23, thereby avoiding such a problem that shooting is interrupted due to the shortage of free memory space in the memory 23.

Further, in step S37, it is determined whether the user operates the camera to change images to be displayed. Here, if the user operates the camera to change images to be displayed, the procedure goes to step S38 to change images to be displayed. On the other hand, if the change of images to be displayed is not instructed in step S37, step S38 is skipped.

Thus the sequence is completed.

According to the first embodiment, there can be provided a camera capable of capturing a rapid movement of a person properly.

In other words, when the camera performs rapid sequential shooting, only images deemed appropriate as good shots are automatically selected from among a large number of sequential images so that the selected images can be recorded preferentially. Thus, there can be provided such a camera in a simple structure that can analyze the movement or shape of a subject to determine a pose deemed most worthy to be recorded, and hence that enables even beginners to get their best shots.

Note that only the candidate images can be recorded in step S26. In this case, since the candidate images can be selected during shooting, if images other than the candidate images are not stored, more good shots can be captured at high speed without undue waste.

Further, in this embodiment, a candidate image once obtained is further determined and confirmed using other criteria. However, the present invention is not limited thereto, and the candidate image once confirmed does not necessarily need to be further determined using other criteria. If the further determination is not made, processing speed can be further increased though the number of candidate images is restricted.

Second Embodiment

A second embodiment of the present invention will next be described.

In the second embodiment to be described below, since the basic structure of the camera is the same as that of the aforementioned first embodiment, the same components are given the same reference numerals and their description is omitted to avoid duplicated description. The following describes only the different points.

Figure 10:
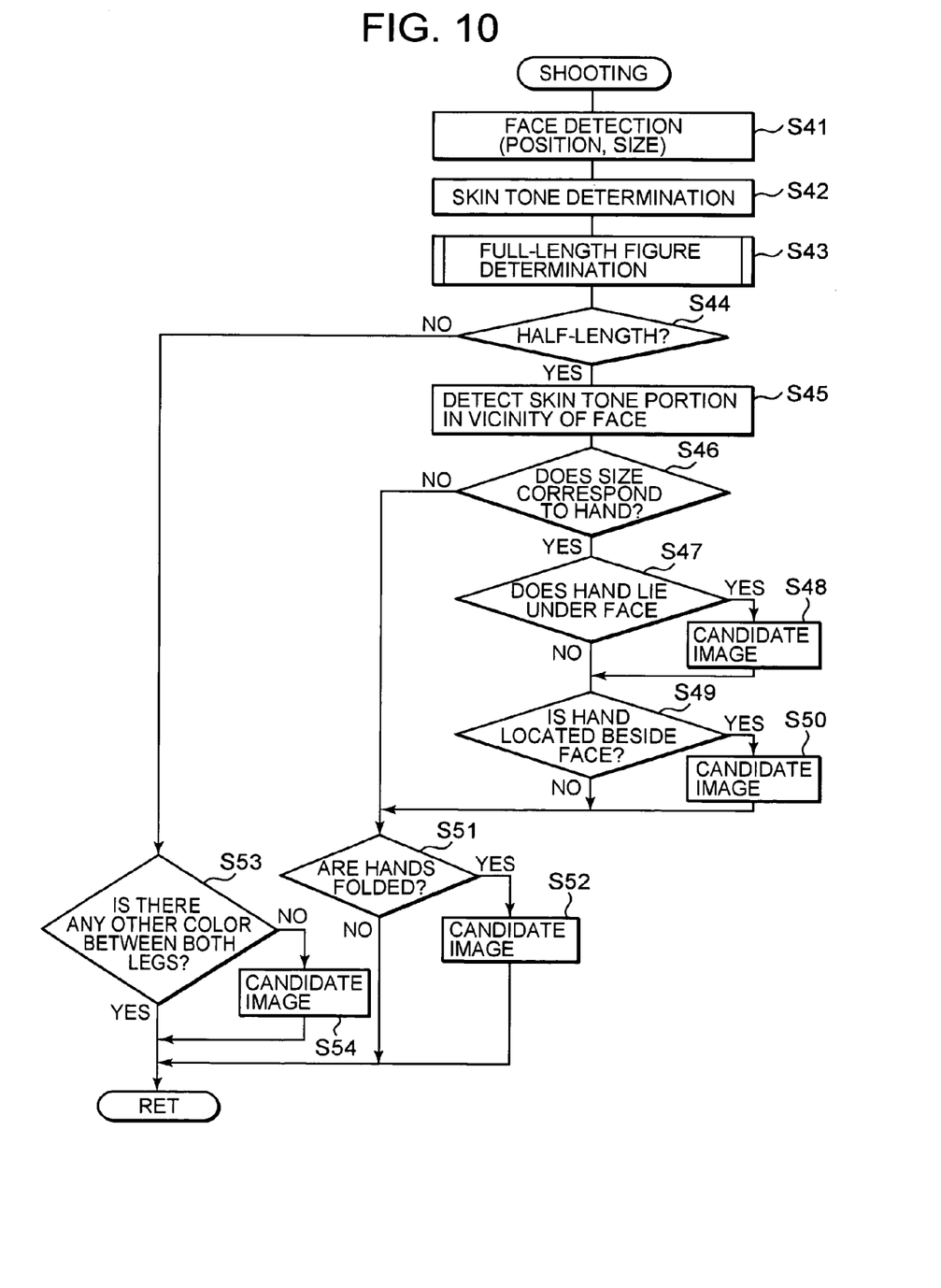
FIG. 10 is a flowchart for explaining the shooting operation of a camera according to a second embodiment of the present invention.

FIG. 10 is a flowchart for explaining the shooting operation of the camera in the second embodiment of the present invention.

Figure 11A:
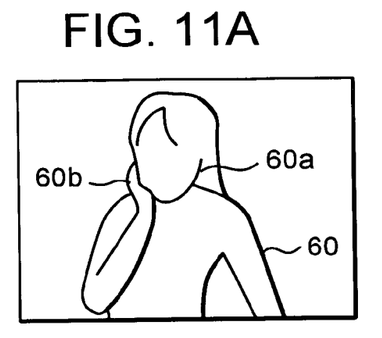
FIGS. 11A to 11D are views for explaining face portion detection in the second embodiment.
Figure 11B:
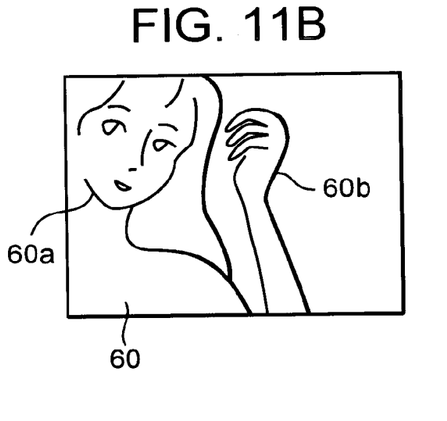
Figure 11C:
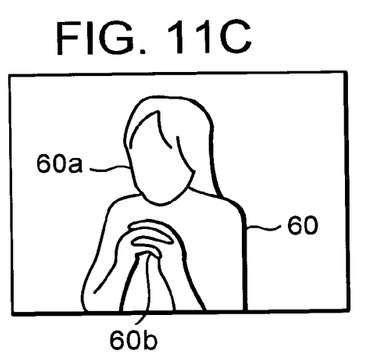

In this second embodiment, the skin tone of a subject is identified according to the results of face detection during shooting (or prior to shooting), and based on the skin tone, if a portion other than the face has the same skin tone and is about half as large in size as the face, the portion with the skin tone is determined as a hand (or back of a hand). The skin tone is determined from color information of captured image data, for example, based on a distribution of R/G and B/G ratios of the captured image data among R (red color information), G (green color information), and B (blue color information) in a predetermined area inside a screen. The skin tone is determined by a program executed inside the MPU. In this sense, the MPU can be referred to as a skin tone detection part. Thus, if frequently shot poses of a subject as shown in FIGS. 11A to 11C are detected, these images are selected as good shot candidates.

When this sequence is started, face detection is first performed in step S41 to detect the position and size of a face portion in the screen. Then, in step S42, skin tone detection is performed from the color tone of the face portion detected in step S41. Further, in step S43, a subroutine "full-length figure determination" is executed. The details of this subroutine "full-length figure determination" will be described later.

Then, in step S44, it is determined whether the subject is a half-length or full-length figure from the position and size of the face of the subject. If it is determined to be half-length shooting, the procedure goes to step S45 to detect a skin tone portion in the vicinity of the face based on the determined skin tone of the face portion. Then, the size of the detected skin tone portion is compared with the size of the face portion, and if it is about half as large in size as the face portion, it is then determined in step S46 whether the size of the skin tone portion corresponds to the size of a hand.

If the size of the skin tone portion corresponds to the size of a hand, the procedure shifts to hand position determination processing starting from step S47. In step S47, it is determined, for example, as shown in FIG. 11A, whether the position of a detected hand 60b lies under a face 60a of a subject 60. Here, if it is determined that the position of the detected hand lies under the face portion, the procedure goes to step S48 to select the pose as a good shot candidate image. On the other hand, if it is determined that the position of the detected hand does not lie under the face portion, step S48 is skipped.

Similarly, in step S49, it is determined, for example, as shown in FIG. 11B, whether the position of the detected hand 60b is beside the face 60a of the subject 60. Here, if it is determined that the position of the detected hand is beside the face portion, the procedure goes to step S50 to select the pose as a good shot candidate image. On the other hand, if it is determined that the position of the detected hand is not beside the face portion, step S50 is skipped.

Figure 12:
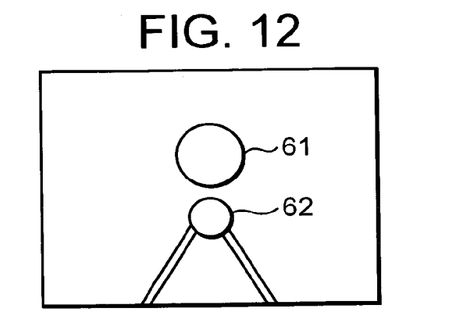
FIG. 12 is a view for explaining determination as to whether both hands of the subject are folded.

Then, in step S51, it is determined, for example, as shown in FIG. 11C, whether hands 60b of the subject 60 are folded. Here, if it is determined that the hands of the subject are folded, the procedure goes to step S52 to select the pose as a good shot candidate image. The determination of whether both hands of the subject are folded can be made by detecting a hand portion 62 having the same color tone as a face portion 61 as shown in FIG. 12 and detecting contours by sharpness emphasis processing or the like in the same manner as in the first embodiment to determine whether two contours are radially extended from the hand portion.

Figure 11D:
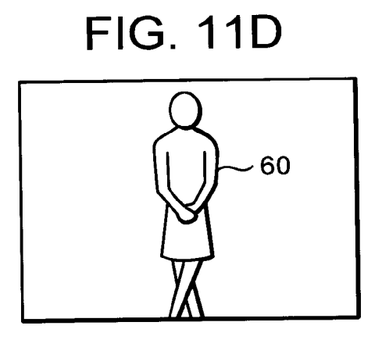

On the other hand, if it is determined in step S44 that it is not half-length (upper body) shooting, it is considered that full-length shooting is being done, and the procedure shifts to step S53. In step S53, the skin tone portion determined in the skin tone determination step S42 is determined as to whether it lies downward on the screen. In this case, a portion having contours extended downward is considered to be legs of the subject, and if a color other than the skin tone color does not appear between both legs, the procedure goes to step S54. In step S54, for example, as shown in FIG. 11D, a pose of the subject crossing her legs is selected as a candidate image.

Note that the determination of whether both hands are folded can be made by prestoring, in the flash ROM 15, templates indicating coordinate positions or areas as reference conditions to compare each pose therewith in the same manner as in the aforementioned first embodiment. Of course, the pose can be determined further using data indicating the results of tracking changes in the coordinates or area together with the templates.

Thus, only the candidate images that meet predetermined conditions can be extracted from a large number of shot images, and this makes it easy to obtain good shot candidate images.

The subroutine "full-length figure determination" in step S43 of the flowchart of FIG. 10 is executed from the following point of view.

Figure 13:
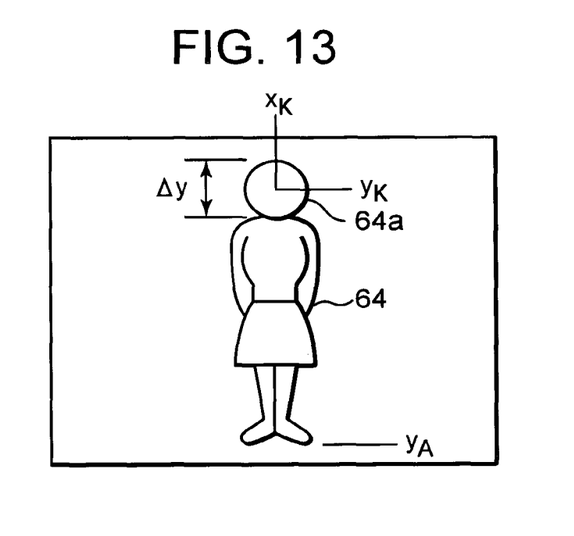
FIG. 13 is a view for explaining a subroutine "full-length figure determination" in step S43 of the flowchart of FIG. 10.

As shown in FIG. 13, suppose that the coordinates of a face 64a of a person 64 in a screen is determined as $(x_k, y_K)$ on the basis of the bottom left as a point of origin to determine the size of the face as $\Delta y$. In this case, the distance from the bottom of the screen to the top of the head is about $y_K + \Delta y/2$.

Under this condition, if the proportion of head to total body length is set to 1:6 to calculate $6 \times \Delta y$, the coordinate position of the tiptoe is determined as $y_A$. When the value $y_A$ is larger than the point of origin y=0, it can determined to be a full-length figure, while when the value $y_A$ is smaller, it can be determined that the image does not include up to the subject's tiptoes. Of course, the proportion varies from person to person, or depending on whether the subject is a child or adult. Here, based on an average value, a calculation method as shown in the following equation is employed:

$$y_A = y_K + (\Delta y/2) - 6\Delta y \quad (1)$$

Figure 14:
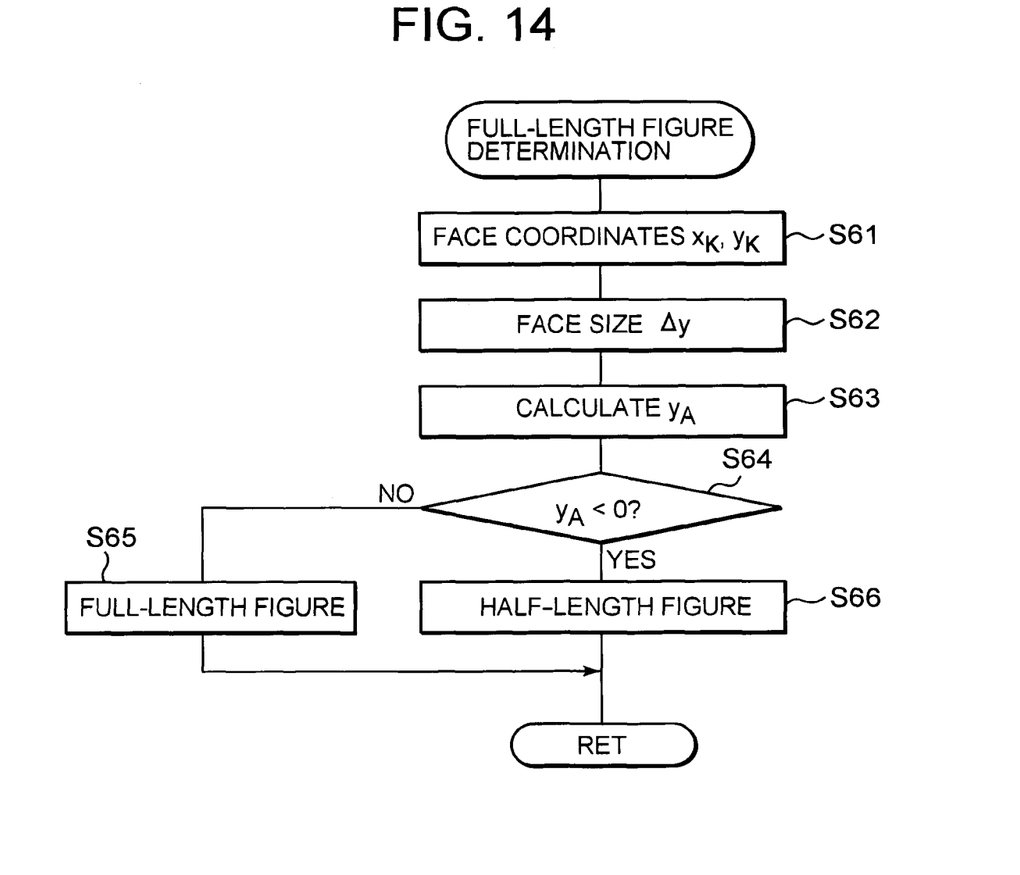
FIG. 14 is a flowchart for explaining the details of the subroutine "full-length figure determination" in step S43 of the flowchart of FIG. 10.

FIG. 14 is a flowchart for explaining the subroutine "full-length figure determination" to determine whether the subject is a full-length or half-length figure from the above-mentioned point of view.

When the subroutine is started, the face coordinates $(x_K, y_K)$ are first detected in step S61, and the size of the face $\Delta y$ is then detected in step S62. This detection is performed by a method like pattern matching using the shadows of eyes, nose, and mouth as used for personal authentication or security camera.

In step S63, the position of the foot (tiptoe) $y_A$ is determined according to the equation (1). Then, in step S64, it is determined whether the position of the foot (tiptoe) $y_A$ is inside or outside of the screen. Here, if $y_A$ is zero or larger, the procedure goes to step S65 to process the image as a full-length figure. On the other hand, if $y_A$ is less than zero, the procedure goes to step S66 to process the image as a half-length figure.

Third Embodiment

A third embodiment of the present invention will next be described.

In the third embodiment to be described below, since the basic structure of the camera is the same as that of the aforementioned first and second embodiments, the same components are given the same reference numerals and their description is omitted to avoid duplicated description. The following describes only the different points.

The techniques as described in the first and second embodiments can be effectively used when the user wants to leave in the memory only images depicting appropriate and timely scenes selected from among a plurality of images repeatedly shot at high speed.

Figure 15:
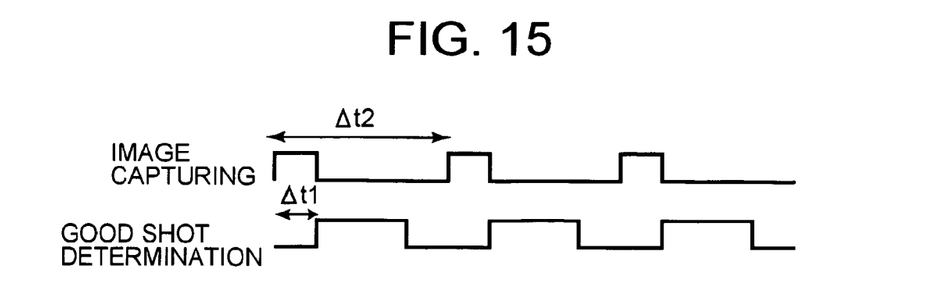
FIG. 15 is a timing chart showing the timings of image capturing and good shot determination.

However, as shown in FIG. 15, a time period $\Delta t2$ is required from when each image is captured and displayed until completion of good shot determination. If the start of the most timely shooting is decided from the determination criteria for the image just captured, the shooting timing is affected by the time lag $\Delta t2$. Therefore, in the third embodiment, all captured images are once recorded, and as a result of good shot determination on each image, a priority flag is added to a corresponding image file.

In this case, there is no time lag between the time of recording each image in the above-mentioned manner and the time required to determine the image. Further, good shot images can be displayed preferentially after completion of shooting.

Figure 17A:
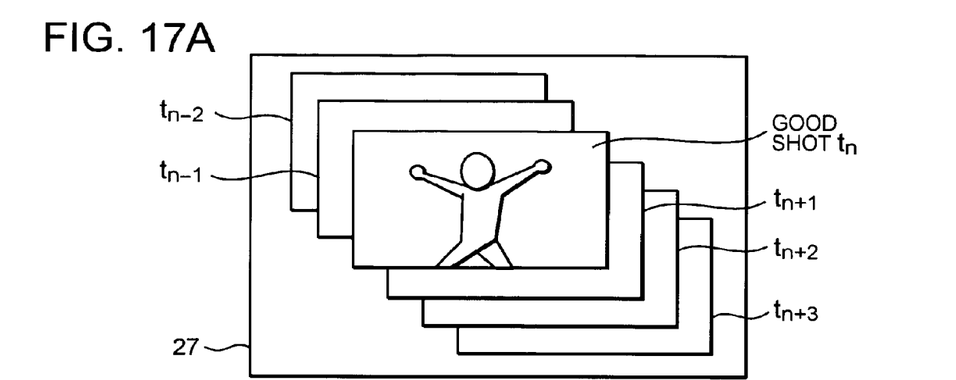
FIGS. 17A to 17C are views showing display modes for displaying an image determined to be a good shot and the other images.
Figure 17B:
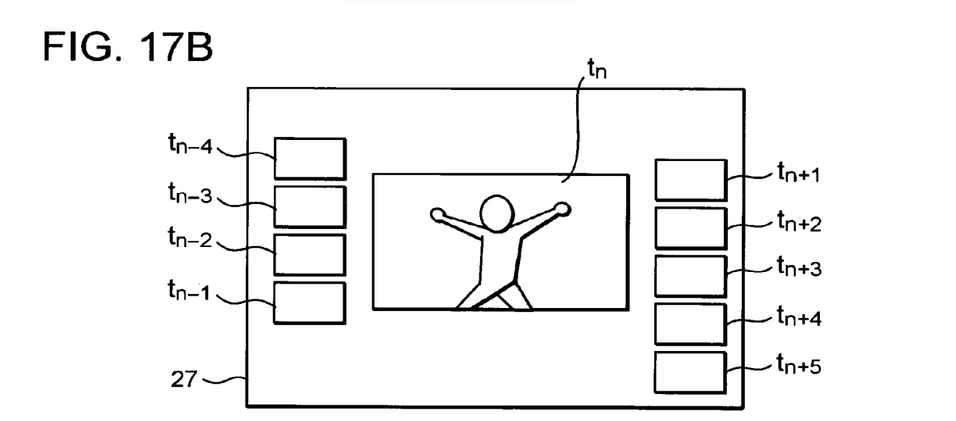

In order to effectively display an image determined to be a good shot, display control is so performed that the captured images are cascaded on display part 27, with the image determined to be a good shot displayed on the top as shown in FIG. 17A. Alternatively, as shown in FIG. 17B, the image determined to be a good shot can be displayed at the center of the screen as the largest image, with the others displayed around it as thumbnail images. On this display screen, the user can determine the necessity of images other than that determined as a good shot to instruct deletion if the user determines them to be unnecessary, thereby deleting all but the good shot image.

Figure 16:
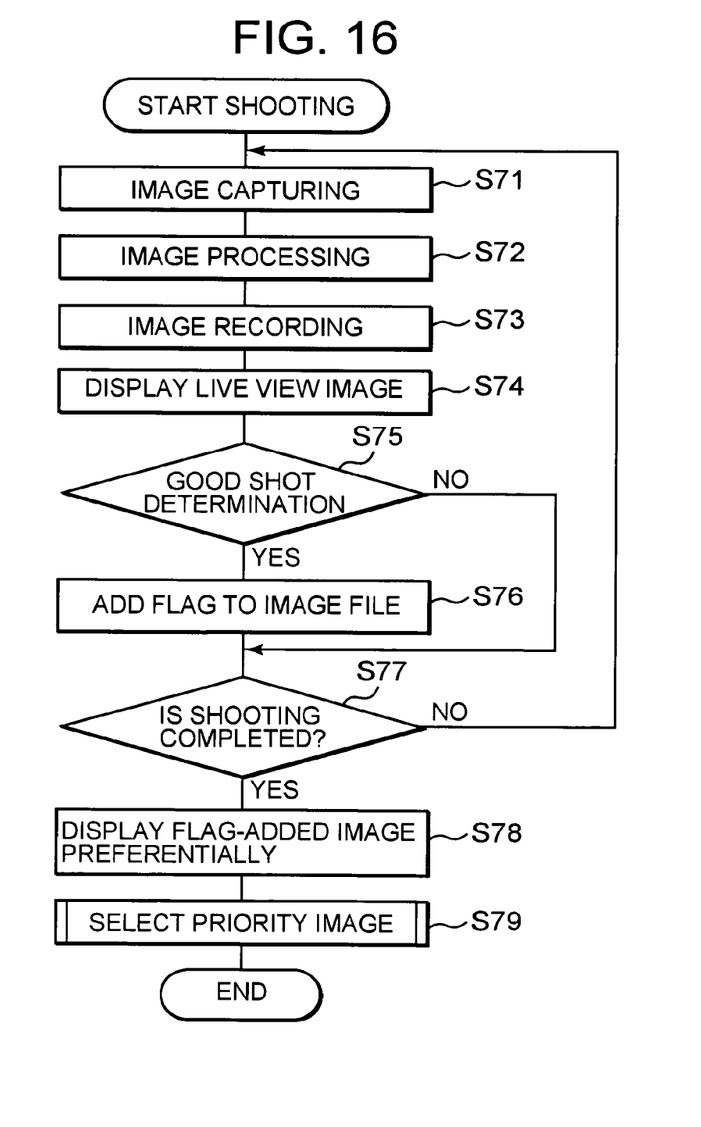
FIG. 16 is a flowchart for explaining the shooting operation of a camera according to a third embodiment of the present invention.

FIG. 16 is a flowchart of the above-mentioned processing. Image data captured in step S71 undergoes image processing in step S72. Then, the image data processed into a recording data format is recorded in the memory in step S73. After that, a live view image is displayed in step S74.

Then, in step S75, good shot determination is performed from image data displayed in step S74. This determination is performed using the determination method described in the first or second embodiment. If it is determined in step S75 to be a good shot image, the procedure goes to step S76 in which a flag indicating a good shot image is recorded in a corresponding image file as supplementary information. After that, in step S77, it is determined whether the turn-off of the release is instructed. If it is determined that turn-off of the release is instructed, the image capturing is completed, and in step S78, the flag added image is displayed on the display part 27 in preference to the other captured images. After that, a priority image is selected in step S79. On the other hand, if it is determined in step S77 that shooting is ongoing, the procedure returns to step S71 to continue shooting.

Figure 18:
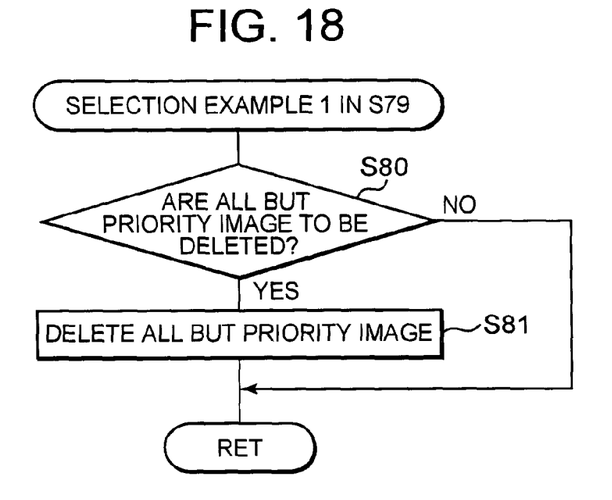
FIG. 18 is a flowchart showing an example of a subroutine "priority image selection" in step S79 of the flowchart of FIG. 16.

In step S79, processing as shown in FIG. 18 is performed. In other words, it is determined in step S80 whether to delete all recorded images but the priority image. This instruction is determined according to a user's operation based on the images and/or information displayed on the display part 27. If it is determined that all but the priority image are to be deleted, all shot and recorded image data but the priority image are deleted (erased) from the memory in step S81.

Figure 19:
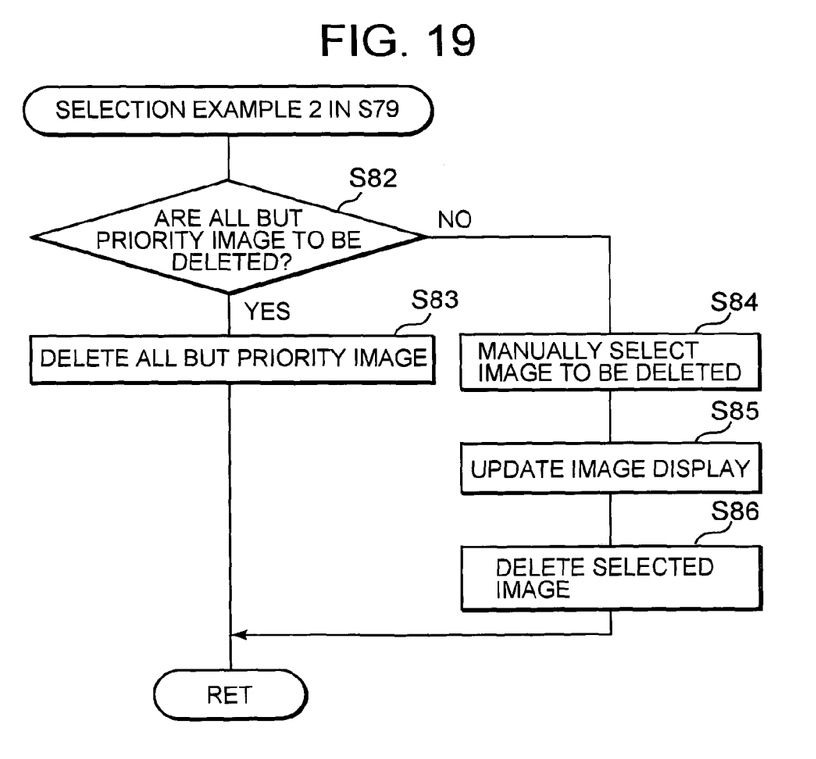
FIG. 19 is a flowchart showing another example of the subroutine "priority image selection" in step S79 of the flowchart of FIG. 16.

As another application of priority selection on the screen, if the image determined to be a good shot is not desired one, a good shot image can be manually selected form other images as shown in FIG. 19.

Figure 17C:
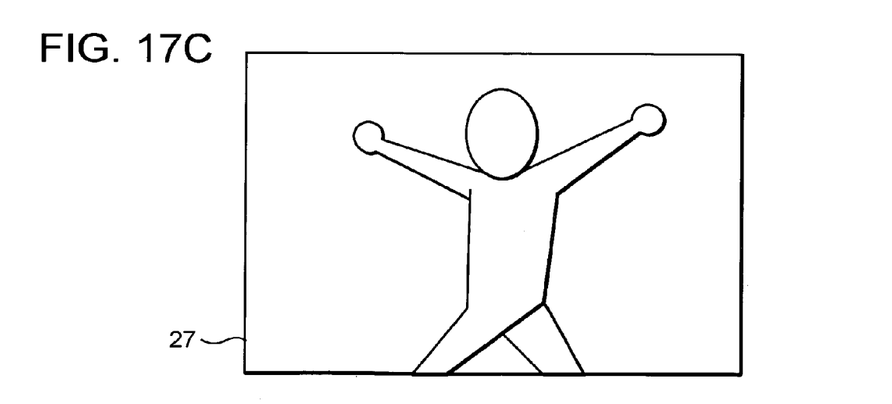

In this case, the image determined to be a good shot is displayed full-screen as shown in FIG. 17C so that the user can confirm that only this image is recorded so far. This allows the user to take a picture more surely at the best timing without wasted consumption of memory.

In the flowchart of FIG. 19, it is first determined in step S82 whether to delete all recorded images but the priority image. If it is determined that all but the priority image are to be deleted, all shot and recorded image data but the priority image are deleted (erased) from the memory in step S83.

If deletion of all recorded images but the priority image is not selected in step S82, the procedure goes to step S84 to allow the user to manually select images to be deleted. This selection is made in such a manner that the user operates a key to select each image to be deleted from the displayed thumbnail images as shown in FIG. 17B and presses an accept (OK) key to confirm the selection.

After the selection is confirmed, the display images are updated in step S85 to display selected images to be stored, and in step S86, image data selected as images to be deleted are deleted from the memory.

The images selected as images to be stored are stored with their frame numbers assigned in order of shooting. In the above example, although the description is made about manual selection, the results of manual selection can also be stored. Then, when there is a correlation between the good shot determination results and the manual selection results, for example, when there is a common tendency in the amount of shift between shooting times, the amount of shift can be determined and fed back to the good shot determination so that the camera can learn from the feedback using a known method. In this case, an image captured at timing that more reflects user's preferences can be selected.

Further, in the embodiment, the image processing, image recording, image display, and good shot determination are performed in a time sequence, but the present invention is not limited thereto. For example, the good shot determination and other processing can be performed in parallel with each other using a system having two or more MPUs. Use of such a system can perform these processing at a higher speed.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera comprising:
   a face portion detection part configured to detect, in an image signal from an image pickup device, a face portion included in the image signal;
   a face position detection part configured to detect a position and a size of the detected face portion;
   a whole subject image determining part configured to determine whether the image is a whole subject image or a half subject image based on the detected position and largeness of the face portion;
   a pose determining part configured to, (1) if the image is determined as a half subject image, determine a pose of the subject based on whether a positional relationship between the face position and a position corresponding to a hand is a predetermined positional relationship, and (2) if the image is determined as a whole subject image, determine a pose of the subject based on whether a positional relationship between the face position and a position corresponding to a leg is a predetermined positional relationship.

2. The camera according to claim 1 further comprising:
   a skin color detection part configured to detect a color of the face portion as a skin color; and
   a hand portion determining part configured to, if the whole subject image determining part determines that the image is a half image of the subject, determine a part corresponding to a hand based on a color detected by the skin color detection part.

3. The camera according to claim 1 further comprising:
   a skin color detection part configured to detect a color of the face portion as a skin color; and
   a leg portion determining part configured to, if the whole subject image determining part determines that the image is a whole image of the subject, determine a part corresponding to a leg based on the color detected by the skin color detection part.

4. The camera according to claim 1 wherein the pose detection part determines a pose of the subject based on a recorded coordinates of a face and at least one of a hand and a leg, and the detected face position and at least one of the detected hand position and the detected leg position.

5. The camera according to claim 1 wherein the whole subject image determining part determines the image as a whole subject image when yA is more than or equal to zero and as a half subject image when yA is less than zero, where yA is defined in a formula: $yA = yk + (\Delta y/2) - 6 \cdot \Delta y$ where, by setting coordinates as such a Y coordinate is set on a direction of a leg, yk is a position of a face, $\Delta y$ is a largeness of the face, and yA is a position of a leg.

* * * * *